United States Patent [19]

Rotolico et al.

[11] Patent Number: 4,924,059

[45] Date of Patent: May 8, 1990

[54] PLASMA GUN APPARATUS AND METHOD WITH PRECISION ADJUSTMENT OF ARC VOLTAGE

[75] Inventors: Anthony J. Rotolico, Hauppauge; William H. Maidhof, Kings Park, both of N.Y.

[73] Assignee: The Perkin-Elmer Corporation, Norwalk, Conn.

[21] Appl. No.: 423,314

[22] Filed: Oct. 18, 1989

[51] Int. Cl.$^5$ .................................... B23K 9/00

[52] U.S. Cl. .......................... 219/121.48; 219/121.52; 219/121.57; 219/75

[58] Field of Search ........... 219/121.48, 121.5, 121.52, 219/121.51, 74, 75, 130.31, 130.4, 121.57; 313/231.31, 231.41; 315/111.21

[56] References Cited

U.S. PATENT DOCUMENTS

| | | | |
|---|---|---|---|
| 2,960,594 | 6/1958 | Thoppe | 219/75 |
| 3,145,287 | 7/1961 | Siebein | 219/75 |
| 3,627,965 | 1/1966 | Zweig | 219/76 |
| 4,430,546 | 2/1984 | Irons | 219/121.59 |

*Primary Examiner*—M. H. Paschall

*Attorney, Agent, or Firm*—H. S. Ingham; E. T. Grimes

[57] ABSTRACT

A plasma gun apparatus with precision adjustment of arc voltage, includes a gun body with a bore therethrough, a nozzle anode in the bore, a cathode holder engaged in the bore with threads, and a cathode mounted on the cathode holder. A locking ring is engaged in the bore with threads for locking the cathode holder. An inner wrench is formed of a handle attached to a shaft inserted through a hole in the locking ring and engaged with the cathode holder to rotate the same for axial positioning. A sleeve wrench is disposed coaxially over the shaft and engaged with the locking ring. The handle and the sleeve wrench each has a plurality of angular position markings thereon mutually alignable to provide rotational reference for precision positioning of the cathode holder.

14 Claims, 3 Drawing Sheets

PLASMA GUN APPARATUS AND METHOD WITH PRECISION ADJUSTMENT OF ARC VOLTAGE

This invention relates to arc plasma guns and particularly to an arc plasma gun apparatus with provision for precision adjustment of arc voltage and to a method for making such adjustment.

BACKGROUND OF THE INVENTION

Arc plasma guns are utilized for such purposes as thermal spraying which involves the heat softening of a heat fusible material, such as a metal or ceramic, and propelling the softened material in particulate form against a surface to be coated. The heated particles strike the surface and bond thereto. The heat fusible material is typically supplied to the plasma spray gun in the form of powder that is generally below 100 mesh U.S. standard screen size to about 5 microns.

In typical plasma systems an electric arc is created between a water cooled nozzle (anode) and a centrally located cathode. An inert gas passes through the electric arc and is excited thereby to temperatures of up to 15,000 degrees Centigrade. The plasma of at least partially ionized gas issuing from the nozzle resembles an open oxy-acetylene flame.

U.S. Pat. No. 2,960,594 (Thorpe) of a predecesessor-in-interest of the present assignee discloses a basic type of plasma gun. FIG. 1 thereof shows a rod shaped cathode 28 and an anode nozzle 32. The cathode is located coaxially in spaced relationship with the anode nozzle operable to maintain a plasma generating arc between the cathode tip and the anode nozzle. Plasma-forming gas is introduced into an annular space 40 surrounding the cathode.

Thorpe also depicts in FIG. 1 thereof the mounting of the cathode onto an electrode holder 3 which is threaded into the body of the gun so as to provide adjustment of the position of the cathode. As indicated at column 6, lines 17–24, initial striking of the arc is achieved by screwing the electrode body toward the nozzle and retracting it. An alternative method taught for starting the arc is by providing a high frequency source of current. After the arc is struck the same may be "suitably adjusted" by screwing electrode holder 3. It is also indicated that the tip of the electrode may be positioned at a distance away from the entrance of the nozzle. (Column 6, lines 64–66.) However, there is no teaching or suggestion in Thorpe of exactly what position of the cathode is suitable or how to determine such a position.

U.S. Pat. No. 3,627,965 (Zweig) similarly shows a plasma gun with a threaded cathode holder (FIG. 4) and suggests it may be used to alter the arcing gap. Zweig similarly gives no further enlightenment as to the use of the threaded holder. This and the Thorpe patent are representative of early constructions of plasma guns whereby cathode adjustments were for experimental or initial-setting purposes.

U.S. Pat. No. 3,145,287 (Siebein et al) of the present assignee describes a simplified plasma spray gun of a type that has been sold and used commercially for more than 25 years, for example as a METCO type 3MB gun sold by The Perkin-Elmer Corporation, Norwalk Conn. Such guns have a fixed positioning between the cathode and the nozzle anode, which generally has been quite satisfactory for defining a reliable operating arc voltage. Such voltage has a dependence on the exact axial spacing between the cathode and the anode, being proportional over a small distance range so that, for example, a shorter spacing produces a smaller voltage. Therefore, manufacturing tolerance variations as well as an effective increase in spacing due to electrode erosion result in minor variations in arc voltage from gun to gun and from time to time.

As mentioned above the variations are not significant for most applications. However, for certain applications such the plasma spray coating of certain precision gas turbine components, the voltage variations result in enough variation in energy and heating of the spray material to cause a problem in reliable production of the coated components. Also, frequently, a nozzle or even a cathode is prematurely replaced after a small amount of erosion causes an undesirable drift in voltage. In some instances gun parts are selectively assembled to compensate for accumulative manufacturing variations within practical tolerances.

Thus there is a need for precision adjustment of arc voltage, particularly to provide a constant, selected voltage. Such adjustment is even more particularly desired for a type of gun that otherwise has been proven for a specific application so that a full development program to develop spraying parameters for a new gun may be avoided.

Therefore, objects of the present invention are to provide an improved plasma gun apparatus with provision for precision adjustment of arc voltage, to provide for such adjustment in a practical manner, to provide such adjustment for a type of gun that otherwise has been suitable for use in a specific application, and to provide a wrench assembly for making precision voltage adjustments in a modified plasma gun. Another object is to provide a novel method for making voltage adjustments in such a gun. Further objects are to provide a predictable arc voltage and to extend useful life of cathode and anode components.

SUMMARY OF THE INVENTION

The foregoing and other objects are achieved by an plasma gun apparatus comprising a plasma gun comprising a gun body with a bore therethrough receptive of a plasma-forming gas, a nozzle anode retained coaxially in one end of the bore, a cathode holder engaged in the bore with threads so as to be positionable axially by rotation, and an axial cathode mounted on the cathode holder and cooperatively positioned with respect to the anode so that with a plasma-forming gas and an arc voltage applied between the anode and the cathode a plasma stream issues from the nozzle anode. A locking ring with an axial hole therethrough is engaged in the bore with threads in the end opposite the anode and locatable in a locking location for locking the cathode holder in a selected axial position.

A wrench assembly is preferably removable from the plasma gun and comprises an inner wrench and a sleeve wrench. The inner wrench is formed of a handle attached to a shaft, the shaft being insertable through the locking ring hole and having first engagement means engageable with the cathode holder to rotate the same for axial positioning. The sleeve wrench is disposed coaxially over the shaft and has second engagement means engageable with the locking ring to rotate the same between the locking location and a selected location spaced axially from the cathode holder. The handle and the sleeve wrench each has at least one angular position marking thereon mutually alignable while the sleeve wrench is in the selected location so as to provide rotational referencing for precision positioning by the inner wrench of the cathode holder and the cathode axially with respect to the anode, whereby said positioning of the cathode provides for precision adjustment of arc voltage.

The markings should consist of two pluralities of markings equally spaced arcuately respectively on the handle and on the sleeve wrench. Preferably the wrench assembly further comprises retaining means for retaining the sleeve wrench slidingly on the shaft with sufficient axial play to allow engagement of the inner wrench with the cathode holder while the sleeve wrench is engaged with the locking ring. The bore should have a shoulder stop therein for stopping the cathode holder with the cathode in an initial position closest to the nozzle anode, such position representing a minimum arc voltage.

The objects also are achieved with a method utilizing the aforedescribed apparatus. The method comprises selecting the selected location by positioning the cathode holder in an initial axial position and the locking ring in a corresponding initial locking location, holding the inner wrench with the cathode holder in the initial axial position while rotating the sleeve wrench so as to locate the locking ring spaced from the cathode holder such that a pair of position markings mutually aligned, holding the sleeve wrench with the locking ring in the selected location while rotating the inner wrench to position the cathode holder in a selected axial position with a realignment of position markings corresponding to a selected arc voltage, and maintaining the cathode holder in the selected position while rotating the sleeve wrench to relocate the locking ring to a new locking location.

In a preferred embodiment the method further comprises first prepositioning the cathode holder in an initial axial position, operating the plasma gun, and measuring an initial arc voltage, whereby the selected arc voltage is a selected voltage increment from the initial arc voltage. Voltage increments are calibrated against changes in alignments of position markings, by measuring the selected arc voltage for the realignment of position markings and comparing said voltage with the initial arc voltage.

DETAILED DESCRIPTION OF THE INVENTION

Figure 1:
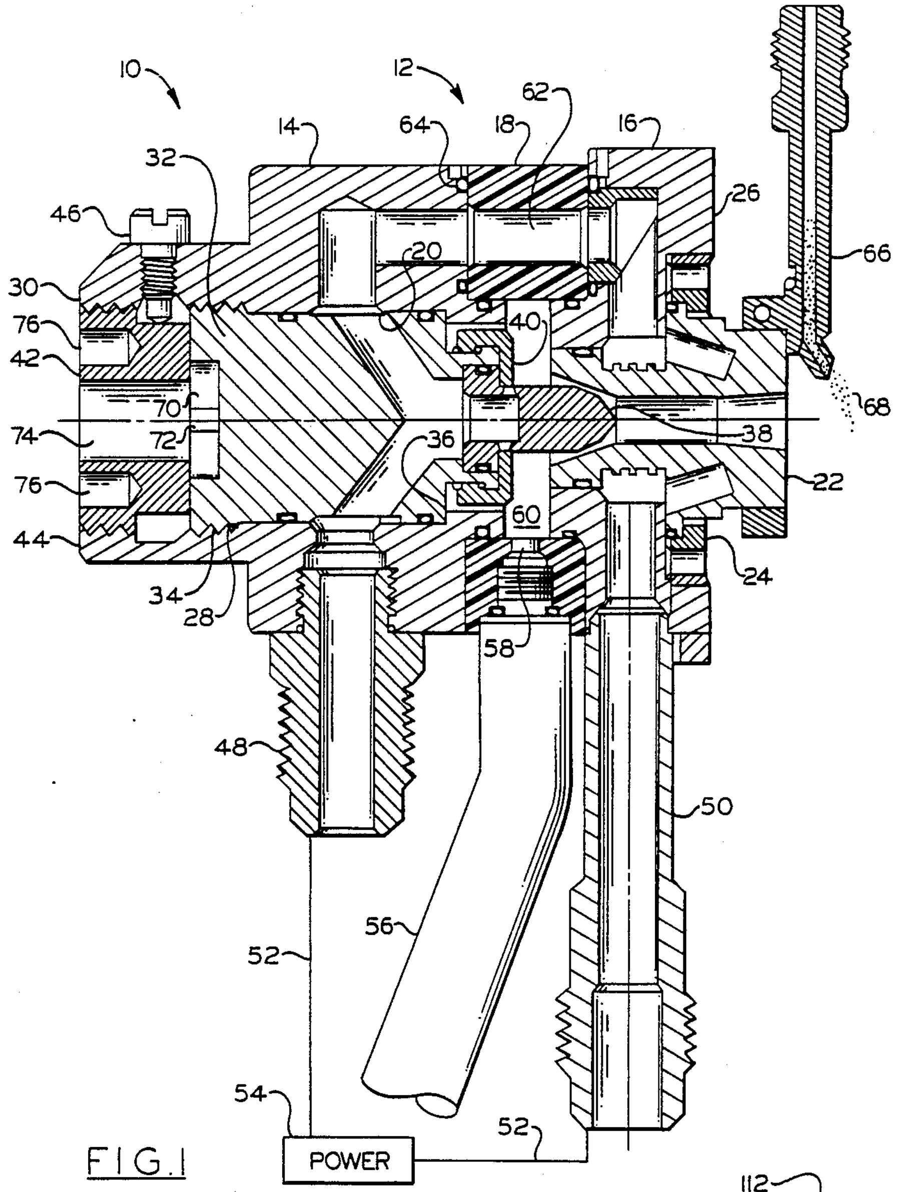
FIG. 1 is a longitudinal section of a plasma gun incorporating the invention.

FIG. 1 shows a plasma gun 10 of the type disclosed in the aforementioned U.S. Pat. No. 3,145,287 and modified according to the present invention. A gun body 12 is formed basically of three parts, namely an electrically conductive rear gun body 14 of brass or the like, a front gun body 16 of similar material, and an electrical insulator 18 sandwiched between the front and rear bodies. This body assembly 12 is held together with insulated bolts (not shown). A central bore 20 extends lengthwise through the body. A nozzle anode 22 of essentially pure copper is retained in the bore of the front gun body with a nozzle retainer ring 24 threaded into the front face 26 thereof, so that the nozzle 22 may be removed and replaced readily.

The bore 22 in the rear gun body 14 has threading 28 therein extending to the back face 30 of the body. A cathode holder 32, also of material similar to that of the rear body, is engaged in the bore of the rear gun body by mating threading 34, so that rotation of the holder in the body positions the holder axially in the bore. A shoulder stop 36 in the bore stops the holder in a forwardmost position nearest the anode 22.

A rod-shaped cathode 38 typically made of thoriated tungsten is mounted axially on the cathode holder 32 with a cathode retainer ring 40 threaded onto the cathode holder, allowing replacement of the cathode. Thus rotation of the holder in the threads 28 provides for axial positioning of the cathode 38 with respect to the anode 22, such positioning generally being with the cathode inserted partially into the nozzle anode as shown.

A locking ring 42 with threads 44 is threaded on threads 34 into the bore so as to be locatable in a locking position (FIG.1) urged against the cathode holder 32 to lock the assembly of the holder and cathode in a selected position. A stop screw 46 extending radially through the rear body 14 to the locking ring further secures the ring in its lock location.

Electrical connectors 48,50are attached respectively to the rear and front gun bodies 14,16 and are receptive conventionally of electrical power via cables 52 from a source 54 for a plasma arc. A conduit 56 for plasma forming gas is attached to the insulator 18 at a through-opening 58 into a chamber 6 in the gun bore generally between the cathode and the nozzle. Optionally a conventional or other desired gas distribution ring (not shown for simplicity) may be inserted into the chamber, to provide radial or tangential gas flow into the chamber.

Cooling channels 62 are provided in the gun for flowing coolant, typically water, around the nozzle 22 and past the cathode 38. Other cooling arrangements may be utilized, for example a thin annular passage and wall of the type taught in U.S. Pat. No. 4,430,546 (Klein et al).

The coolant is supplied conveniently through the electrical connectors 48,50 and cables 52. A number of 0-ring seals 64 are positioned as necessary to retain the coolant in the channels and prevent gas leakage.

With appropriate arc power and gas flow, and initiation of the arc conventionally such as with a high frequency starter voltage applied through the cables, a high velocity plasma stream will be generated and issue from the nozzle 22. A powder injection attachment 66 on the nozzle may be used to inject powder 68 into the plasma stream for coating or other purpose such as spherodization of the powder particles.

A pair of perpendicular slots 70,72 or other engagement means are recessed centrally into the rear face of the cathode holder 32 for engagement to rotate the holder. A central hole 74 passes through the locking ring 42 to provide access to the slots. A second engagement means, conveniently including a pair of diametrically opposite holes 76, are also provided in the locking ring to rotate it.

Figure 2:
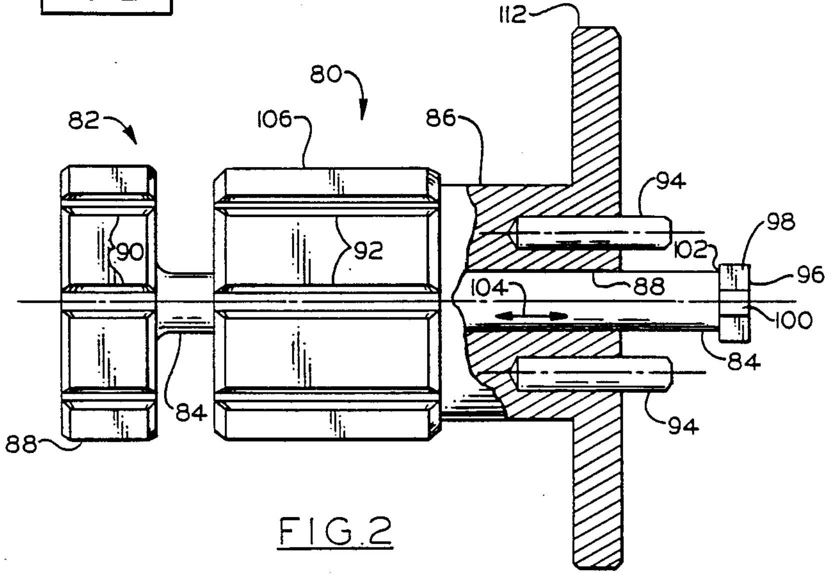
FIG. 2 is a longitudinal view partially in section of a wrench assembly of the invention .

A wrench assembly 80 for positioning the cathode according to the invention is shown in FIG. 2. An inner wrench 82 is formed of a handle 83 attached to a shaft 84. A sleeve wrench 86 with a shaft bore 88 therethrough is disposed coaxially over the shaft, preferably with a sliding fit. The handle and sleeve wrench advantageously each have longitudinal slots 9,92 on the periphery or other similar means for manual gripping. The sleeve wrench has two pins 94 that match the two holes 76 in the locking ring 42 for engaging the ring for rotation in the threads 28. Other engagement means may be used instead.

The end 96 of the shaft has crossed projections 98, 100 that fit into the recessed slots in the manner of a Phillips-head screwdriver. Other means such as an Allen wrench or a socket wrench with an corresponding recess or fitting on the holder, may alternatively be used for engagement means. Preferably the wrench assembly 80 has retaining means 102 for retaining the sleeve wrench 86 slidingly on the shaft 84 with sufficient axial play 104 to allow engagement of the inner wrench 82 with the cathode holder 42 while the sleeve wrench 86 is engaged with the locking ring. Such retaining means may comprise a lateral projection associated with the engagement means, viz. the crossed projections, being radially larger than the shaft bore but small enough to fit into the locking ring hole which is large enough to accommodate the crossed projections.

The handle 83 and a grip 106 on the sleeve wrench 86 each has at least one annular position marking thereon, preferably a plurality of markings equally spaced arcuately. The markings are to provide relative rotational referencing of the two wrenches. It was found that eight such markings on each wrench are suitable. Conveniently, the longitudinal slots 90,92, and additional slots 90',92' for gripping may be positioned and utilized for the markings, particularly with a contrasting color, e.g., white slots in black surfaces. If closer proximity is desired, as an alternative (not shown), markings on the inner wrench may be placed on a thickened portion of the shaft 84 extending into the sleeve wrench.

Figure 3:
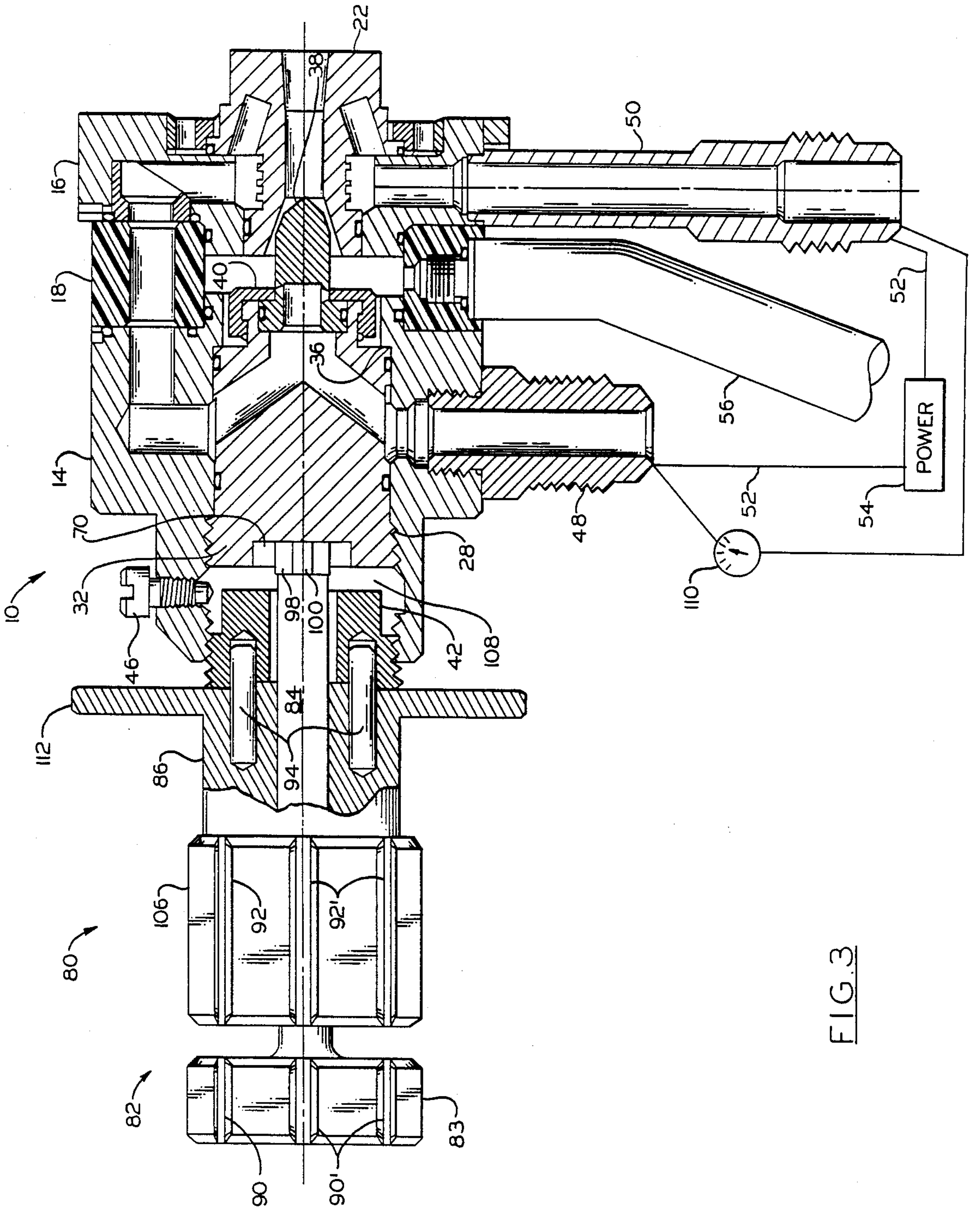
FIG. 3 is an assembly of the components of FIGS. 1 and 2.

To adjust the cathode position, the wrench assembly 80 is inserted into the rear of the plasma gun 10 so that the locking ring 42 and the cathode holder 32 are respectively engaged, as shown in FIG. 3. With the stop screw 46 released the sleeve wrench 86 is used to manually back off the locking ring to provide a space 108 between it and the cathode holder. The inner wrench 82 then is used to rotate the cathode holder until it with the cathode are in a selected axial position.

For precision adjustment of the cathode for a selected voltage, an initial position of the cathode holder first is established. In the beginning this may be with the cathode resting on the shoulder stop 36 as shown in FIG. 1 corresponding to a minimum arc voltage for the gun. The cathode is not close enough to the anode to start the arc without a high frequency starter or other auxiliary starting means. The plasma gun 10 is operated with this setting and the arc voltage is measured at the gun with a voltmeter 110 (FIG. 3). The gun is turned off, and the wrench assembly 80 is inserted. While the cathode holder 32 is held in place with the inner wrench 82, the locking ring 42 is backed off, and the engaged sleeve wrench 86 is rotated precisely to a point where a pair of markings 90,92 on the sleeve and the handle are mutually aligned. This defines a selected location for the locking ring.

Next, while the sleeve wrench is held in place, the inner wrench is rotated to reposition the cathode 38 axially, the amount of rotation being measured by the markings, i.e. fractions of a turn. A flange 112 on the sleeve wrench has a convenient diameter for manually gripping the gun and sleeve simultaneously to hold the latter in place during adjustments with the inner wrench. The locking ring is again locked against the holder and the stop screw is set, readying the gun for operation at a new voltage.

For example if there are eight arcuate markings, the rotation may be measured in eighths of a turn. The degree of rotation for a particular case is determined by calibration of fractions of a turn against voltage increments. Calibration was made for a plasma gun of the type disclosed in the aforementioned U.S. Pat. No. 3,145,287 and sold as a METCO type 3MB gun, adapted as disclosed herein. The gun was operated with a G nozzle, 35 l/min (75 scfh) nitrogen and 6.6 l/min (14 scfh) hydrogen mixture of plasma-forming gas, and 35 kw power in the general range of 76 volts. It was found that a thread pitch of 7.87 threads per cm in the bore for the cathode holder provides for one eighth of a turn to adjust arc voltage by 0.1 volt.

After the beginning setting of the cathode position for a desired voltage, e.g. 76.0 volts, this setting may be established as an initial position for future adjustments. It may be expected that nozzle and/or cathode erosion over a period of time will cause a decrease in arc voltage. When this exceeds a selected amount, e.g. a decrease to 75.5 volts, the cathode position may be reset as described above using a number of calibrated fractions ($\frac{5}{8}$) of a turn required to change the voltage by an increment necessary to return the voltage to the desired level.

Figure 4:
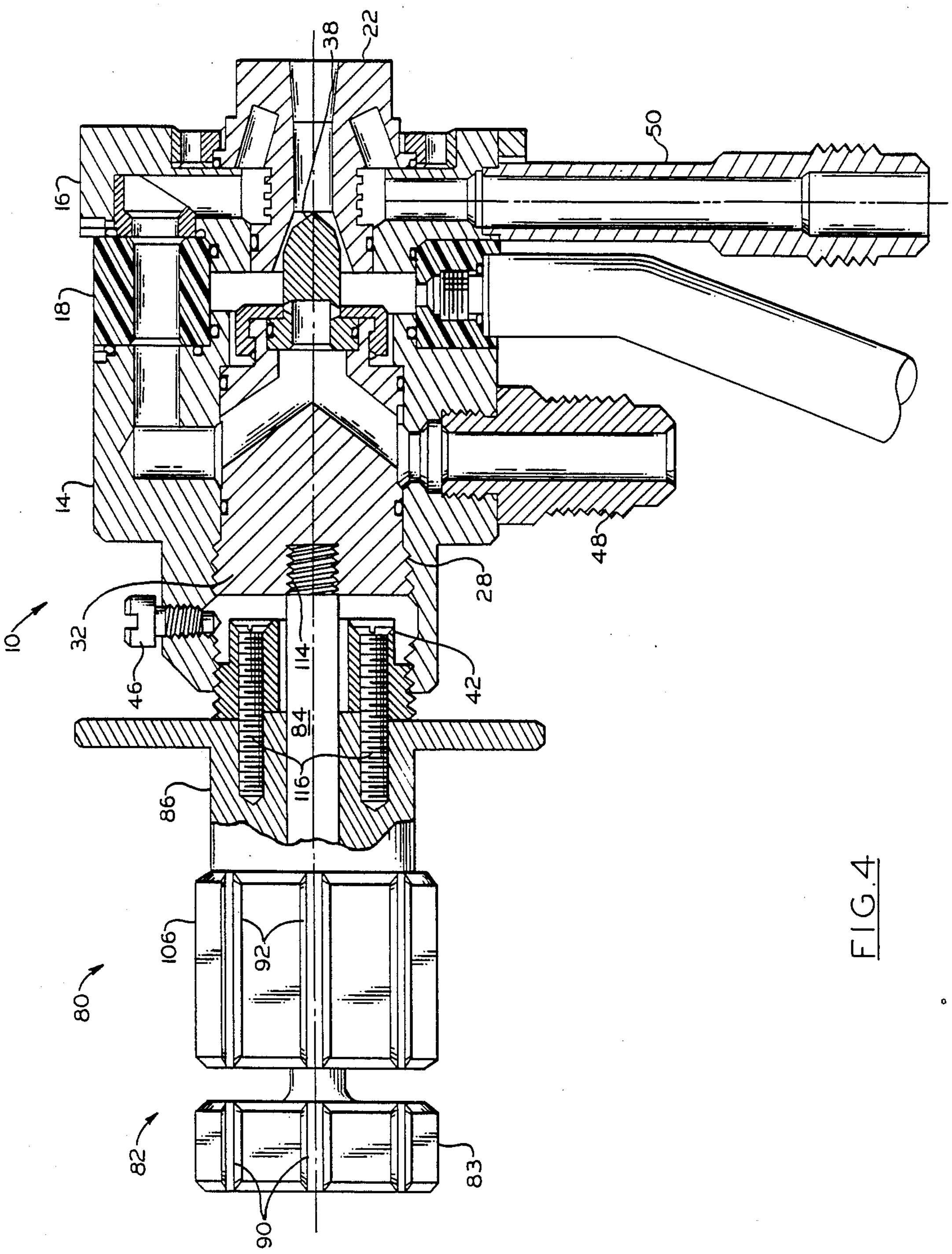
FIG. 4 is a longitudinal view partially in section of an assembly showing a further embodiment of the invention.

As described above the wrench assembly 80 is separable from the plasma gun 10, for maintaining a relatively light, simple gun. In an alternative embodiment shown in FIG. 4 the assembly 80 may be affixed to the gun, with permanent engagement of the wrenches. Such engagement may be effected by affixing the inner wrench into the cathode holder with threads 114 and by attaching the sleeve wrench 86 to the locking ring 42 with screws 116, still leaving the two parts 32,42 independently rotatable. In a variation the sleeve may simply be a rearward extention of the locking ring of unitary fabrication. In a further embodiment the sleeve and locking ring may be unitary and the inner wrench may be removable.

The invention thus provides for precision establishment and maintenance of a constant arc voltage. It also allows for longer useful life of the cathode and anode components, since such parts can be retained in use longer by adjustments to maintain the desired voltage instead of replacing the components when voltage drifts outside the desired range because of erosion by the arc.

While the invention has been described above in detail with reference to specific embodiments, various changes and modifications which fall within the spirit of the invention and scope of the appended claims will become apparent to those skilled in this art. Therefore, the invention is intended only to be limited by the appended claims or their equivalents.

What is claimed is:

1. A plasma gun apparatus with precision adjustment of arc voltage, comprising a gun body with a bore therethrough receptive of a plasma-forming gas, a nozzle anode retained coaxially in one end of the bore, a cathode holder engaged in the bore with threads so as to be positionable axially by rotation, an axial cathode mounted on the cathode holder and cooperatively positioned with respect to the anode so that with a plasma-forming gas and an arc voltage applied between the anode and the cathode a plasma stream issues from the nozzle anode, a locking ring with an axial hole therethrough engaged in the bore with threads in the end opposite the anode and locatable in a locking location for locking the cathode holder in a selected axial position, an inner wrench formed of a handle attached to a shaft inserted through the locking ring hole and engaged with the cathode holder to rotate the same for axial positioning, and a sleeve wrench disposed coaxially over the shaft and engaged with the locking ring to rotate the same between the locking location and a selected location spaced axially from the cathode holder, the handle and the sleeve wrench each having at least one angular position marking thereon mutually alignable while the sleeve wrench is in the selected location so as to provide rotational reference for precision positioning by the inner wrench of the cathode holder and the cathode axially with respect to the anode, whereby said positioning of the cathode provides for precision adjustment of arc voltage.

2. The apparatus according to claim 1 wherein the inner wrench and the sleeve wrench are removable respectively from the cathode holder and the locking ring.

3. The apparatus according to claim 1 wherein the sleeve wrench is affixed to the locking ring.

4. The apparatus according to claim 2 wherein the inner wrench is affixed to the cathode holder.

5. The apparatus according to claim 1 wherein the markings consist of two pluralities of markings equally spaced arcuately respectively on the handle and on the sleeve wrench.

6. The apparatus according to claim 1 wherein the bore has a shoulder stop therein for stopping the cathode holder with the cathode in an initial position closest to the nozzle anode, such position representing a minimum arc voltage.

7. A plasma gun apparatus with precision adjustment of arc voltage, comprising:

a plasma gun comprising a gun body with a bore therethrough receptive of a plasma-forming gas, a nozzle anode retained coaxially in one end of the bore, a cathode holder engaged in the bore with threads so as to be positionable axially by rotation, an axial cathode mounted on the cathode holder and cooperatively positioned with respect to the anode so that with a plasma-forming gas and an arc voltage applied between the anode and the cathode a plasma stream issues from the nozzle anode, and a locking ring with an axial hole therethrough engaged in the bore with threads in the end opposite the anode and locatable in a locking location for locking the cathode holder in a selected axial position; and a wrench assembly removable from the plasma gun and comprising an inner wrench and a sleeve wrench, the inner wrench being formed of a handle attached to a shaft, the shaft being insertable through the locking ring hole and having first engagement means engageable with the cathode holder to rotate the same for axial positioning, the sleeve wrench fitting slidingly over the shaft and having second engagement means engageable with the locking ring to rotate the same between the locking location and a selected location spaced axially from the cathode holder, and the handle and the sleeve wrench each having at least one angular position marking thereon mutually alignable while the sleeve wrench is in the selected location so as to provide rotational referencing for precision positioning by the inner wrench of the cathode holder and the cathode axially with respect to the anode, whereby said positioning of the cathode provides for precision adjustment of arc voltage.

8. The apparatus according to claim 7 wherein the markings consist of two pluralities of markings equally spaced arcuately respectively on the handle and on the sleeve wrench.

9. The apparatus according to claim 7 wherein the wrench assembly further comprises retaining means for retaining the sleeve wrench slidingly on the shaft with sufficient axial play to allow engagement of the inner wrench with the cathode holder while the sleeve wrench is engaged with the locking ring.

10. The apparatus according to claim 7 wherein the bore has a shoulder stop therein for stopping the cathode holder with the cathode in an initial position closest to the nozzle anode, such position representing a minimum arc voltage.

11. A method for adjusting arc voltage in a plasma gun apparatus including a gun body with a bore therethrough receptive of a plasma-forming gas, a nozzle anode retained coaxially in one end of the bore, a cathode holder engaged in the bore with threads so as to be positionable axially by rotation, an axial cathode mounted on the cathode holder and cooperatively positioned with respect to the anode so that with a plasma-forming gas and an arc voltage applied between the anode and the cathode a plasma stream issues from the nozzle anode, a locking ring with an axial hole therethrough engaged in the bore with threads in the end opposite the anode and locatable in a locking location for locking the cathode holder in a selected axial position, an inner wrench formed of a handle attached to a shaft inserted through the locking ring hole and engaged with the cathode holder to rotate the same for axial positioning, and a sleeve wrench disposed coaxially over the shaft and engaged with the locking ring to rotate the same between the locking location and a selected location spaced axially from the cathode holder, and the handle and the sleeve wrench each having at least one annular position marking thereon mutually alignable while the sleeve wrench is in the selected location so as to provide rotational reference for precision positioning by the inner wrench of the cathode holder and the cathode axially with respect to the anode;

wherein the method comprises selecting the selected location by positioning the cathode holder in an initial axial position and the locking ring in a corresponding initial locking location, holding the inner wrench with the cathode holder in the initial axial position while rotating the sleeve wrench so as to locate the locking ring spaced from the cathode holder such that a pair of position markings are mutually aligned, holding the sleeve wrench with the locking ring in the selected location while rotating the inner wrench to position the cathode holder in a selected axial position with a realignment of position markings corresponding to a selected arc voltage, and maintaining the cathode holder in the selected position while rotating the sleeve wrench to relocate the locking ring to a new locking location.

12. The method according to claim 11 further comprising first prepositioning the cathode holder in an initial axial position, operating the plasma gun, and measuring an initial arc voltage, whereby the selected arc voltage is a selected voltage increment from the initial arc voltage.

13. The method according to claim 12 further comprising calibrating voltage increments against changes in alignments of position markings, by measuring the selected arc voltage for the realignment of position markings and comparing said voltage with the initial arc voltage.

14. The method according to claim 13 wherein the bore has a shoulder stop therein for stopping the cathode holder with the cathode in the initial position closest to the nozzle anode, such position representing a minimum initial arc voltage.

* * * * *